US012345107B2

(12) United States Patent
Le

(10) Patent No.: US 12,345,107 B2
(45) Date of Patent: Jul. 1, 2025

(54) REDUCTION OF EQUIVALENT CIRCULATING DENSITY IN WELL OPERATIONS

(71) Applicant: WEATHERFORD TECHNOLOGY HOLDINGS, LLC, Houston, TX (US)

(72) Inventor: Tuong T. Le, Katy, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 17/817,079

(22) Filed: Aug. 3, 2022

(65) Prior Publication Data

US 2024/0044219 A1 Feb. 8, 2024

(51) Int. Cl.

*E21B 21/08* (2006.01)
*E21B 4/02* (2006.01)
*F03B 13/02* (2006.01)
*F04C 2/107* (2006.01)
*F04C 13/00* (2006.01)

(52) U.S. Cl.

CPC ................ *E21B 21/08* (2013.01); *E21B 4/02* (2013.01); *F03B 13/02* (2013.01); *F04C 2/1071* (2013.01); *F04C 13/008* (2013.01)

(58) Field of Classification Search

CPC .......... E21B 7/005; E21B 17/22; E21B 21/08; E21B 21/10; E21B 4/02; F04C 2/1071; F04C 13/008; F04C 15/0061; F04C 2/107; F03B 13/02; F05B 2250/25; F03C 2/08

See application file for complete search history.

(56) References Cited

U.S. PATENT DOCUMENTS 1,892,217 A 12/1932 Moineau
4,049,066 A * 9/1977 Richey ...................... E21B 4/02 175/323
4,744,426 A * 5/1988 Reed ....................... E21B 17/22 175/323
6,527,513 B1 3/2003 Van Drentham-Susman et al.
6,837,313 B2 1/2005 Hosie et al.
(Continued)

FOREIGN PATENT DOCUMENTS

CA 2612111 A1 12/2006

OTHER PUBLICATIONS

International Search Report with written Opinion issued Dec. 15, 2023 for PCT Patent Application No. PCT/IB2023/056059, 22 pages.

*Primary Examiner* — Brad Harcourt
(74) *Attorney, Agent, or Firm* — Smith IP Services, P.C.

(57) ABSTRACT

An equivalent circulating density (ECD) reduction tool can include a positive displacement fluid motor, and a fluid pump configured to be driven by the fluid motor. The fluid pump can include a fluid inlet and a fluid outlet disposed on respective opposite sides of an external flow restriction. A method of controlling equivalent circulating density (ECD) in a well can include connecting an ECD reduction tool in a tubular string, deploying the tubular string with the ECD reduction tool into the well, thereby forming an annulus between the tubular string and a well surface surrounding the tubular string, and flowing a fluid into the well through the tubular string, the fluid returning from the well via the annulus. The flowing step can include operating a positive displacement fluid motor of the ECD reduction tool, the fluid motor thereby rotating an impeller shaft of a fluid pump.

15 Claims, 4 Drawing Sheets

(56) References Cited

U.S. PATENT DOCUMENTS

| | | | | |
|---|---|---|---|---|
| 6,896,075 | B2 * | 5/2005 | Haugen | E21B 4/02<br>166/380 |
| 7,096,975 | B2 | 8/2006 | Aronstam et al. | |
| 7,111,692 | B2 | 9/2006 | Hosie et al. | |
| 7,721,822 | B2 | 5/2010 | Krueger et al. | |
| 2002/0187037 | A1 * | 12/2002 | Lee | F04D 13/10<br>415/199.2 |
| 2003/0098181 | A1 | 5/2003 | Aronstam et al. | |
| 2003/0146001 | A1 * | 8/2003 | Hosie | E21B 21/08<br>166/105 |
| 2005/0045382 | A1 | 3/2005 | Hosie et al. | |
| 2006/0157282 | A1 | 7/2006 | Tilton et al. | |
| 2013/0025940 | A1 * | 1/2013 | Grimmer | E21B 21/08<br>175/48 |
| 2022/0049558 | A1 | 2/2022 | Pye et al. | |

* cited by examiner

REDUCTION OF EQUIVALENT CIRCULATING DENSITY IN WELL OPERATIONS

BACKGROUND

This disclosure relates generally to equipment utilized and operations performed in conjunction with a subterranean well and, in an example described below, more particularly provides for reduction of equivalent circulating density (ECD) while performing well operations.

In various types of well operations (such as, drilling, completing, stimulating, etc.) it is important to maintain control over pressure in the well. For example, in under-balanced drilling, it is desirable to maintain pressure in a wellbore somewhat less than a pore pressure of an earth formation penetrated by the wellbore. In over-balanced drilling, it is desirable to maintain the wellbore pressure somewhat greater than the formation pore pressure. In balanced drilling, it is desirable for the wellbore pressure and the pore pressure to be approximately the same.

It will, therefore, be appreciated that improvements are continually needed in the art of controlling downhole pressure in well operations. The present disclosure provides such improvements to the art, which improvements may be utilized in a variety of different types of well operations.

DETAILED DESCRIPTION

Figure 1:
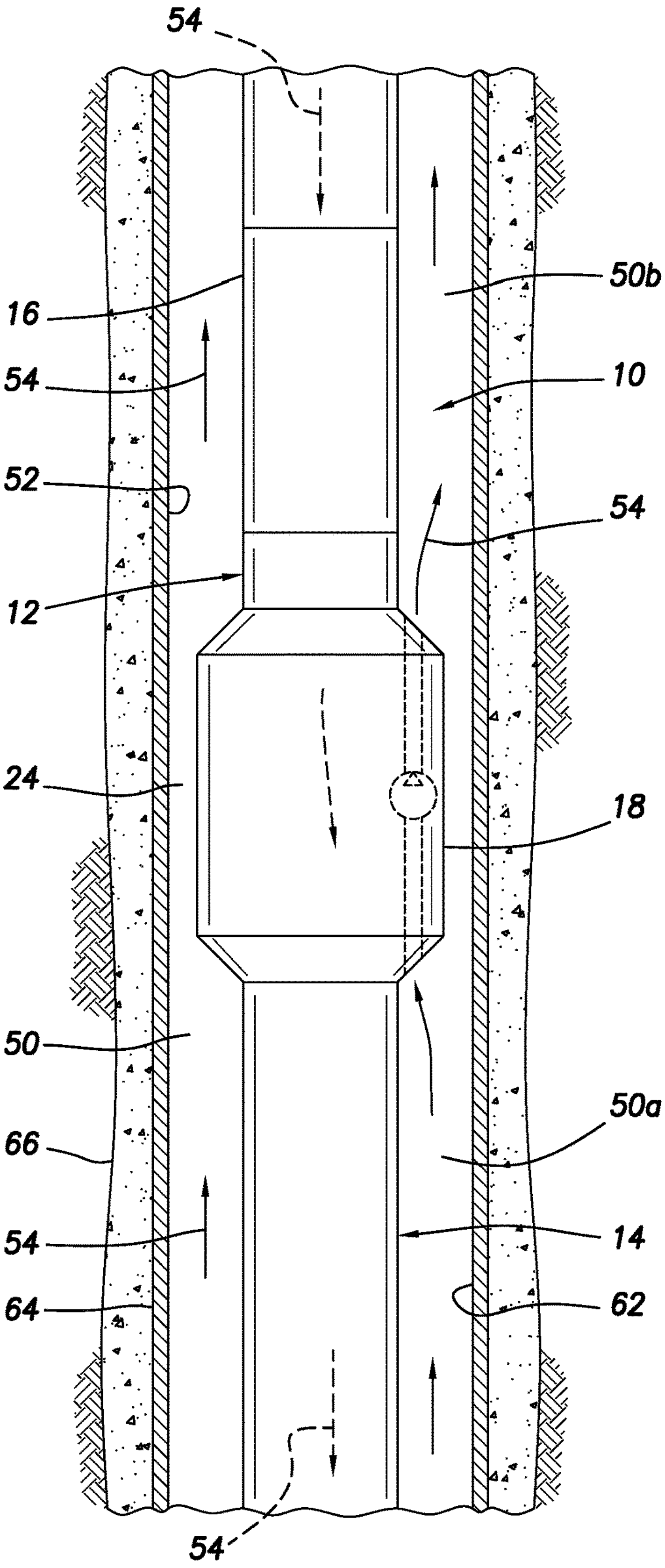
FIG. 1 is a representative partially cross-sectional view of an example of a well system and associated method which can embody principles of this disclosure.

Representatively illustrated in FIG. 1 is a system 10 for use with a subterranean well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, an equivalent circulating density (ECD) reduction tool 12 is connected as part of a tubular string 14 deployed into a wellbore 62. The wellbore 62 is lined with casing 64 and cement 66. In other examples, the ECD reduction tool 12 may not be positioned in a wellbore lined with casing and cement (for example, the ECD reduction tool could be positioned in a riser extending between a wellbore and a water-based rig, or the ECD reduction tool could be positioned in an uncased section of a wellbore).

An annulus 50 is formed radially between the tubular string 14 and an inner well surface 52. As depicted in FIG. 1, the well surface 52 is an inner surface of the casing 64, but in other examples the inner surface could be an uncased surface of the wellbore 62, an inner surface of a tubular structure surrounding the tubular string 14, or another type of well surface.

A fluid 54 is circulated downward through the tubular string 14 and into the wellbore 62, returning to the surface via the annulus 50. For example, in a drilling operation, the fluid 54 can be used to cool and lubricate a drill bit connected at a downhole end of the tubular string 14, and to convey drill cuttings to the surface via the annulus 50. However, the scope of this disclosure is not limited to any particular type of well operation conducted with the ECD reduction tool 12.

A density of the fluid 54 produces hydrostatic pressure in the wellbore 62. It is advantageous to be able to control the pressure in the wellbore 62. For example, in drilling operations, it may be desirable for pressure in the wellbore 62 to be equal to, or somewhat greater or lesser than, pore pressure in an earth formation penetrated by the wellbore.

When the fluid 54 is circulating through the tubular string 12 and the annulus 50, the pressure produced in the wellbore 62 will be somewhat different from the pressure that would be produced if the fluid were static in the wellbore. This is due to factors such as fluid friction and restrictions to flow along the fluid flow path. For this reason, those skilled in the art use an "equivalent circulating density" of a fluid to determine pressure in a wellbore when the fluid is flowing.

In the FIG. 1 example, it is desired to reduce the pressure in the wellbore 62 that would be otherwise produced by an equivalent circulating density of the fluid 54. Specifically, it is desired to reduce the pressure in a lower section 50*a* of the annulus 50. The ECD reduction tool 12 is positioned in the wellbore 62 between the lower annulus section 50*a* and an upper section 50*b* of the annulus 50. As described more fully below, the ECD reduction tool 12 reduces pressure in the lower annulus section 50*a* by pumping the fluid 54 from the lower annulus section 50*a* to the upper annulus section 50*b* using a fluid pump 18 of the tool 12.

A flow restriction 24 is formed between the tool 12 and the surrounding well surface 52. Thus, when the fluid 54 is pumped from the lower annulus section 50*a* to the upper annulus section 50*b*, a pressure differential across the flow restriction 24 is varied. By pumping the fluid 54 from the lower annulus section 50*a* at a sufficient rate, the pressure in the lower annulus section 50*a* can be reduced as desired.

To operate the fluid pump 18, the tool 12 also includes a fluid motor 16. In the FIG. 1 example, the fluid motor 16 is connected uphole of the fluid pump 18, but in other examples, the fluid motor could be downhole of the fluid pump, or these components could be integrated into a single assembly.

The fluid motor 16 operates in response to the flow of the fluid 54 through the fluid motor. Preferably, the fluid motor 16 comprises a positive displacement fluid motor (such as, a Moineau-type fluid motor). Thus, when the fluid 54 is flowed through the tubular string 14, this causes the fluid motor 16 to operate the fluid pump 18, resulting in pressure in the lower annulus section 50*a* being reduced (as compared to the pressure that would have been produced by the ECD of the fluid without use of the ECD reduction tool 12).

Figure 2:
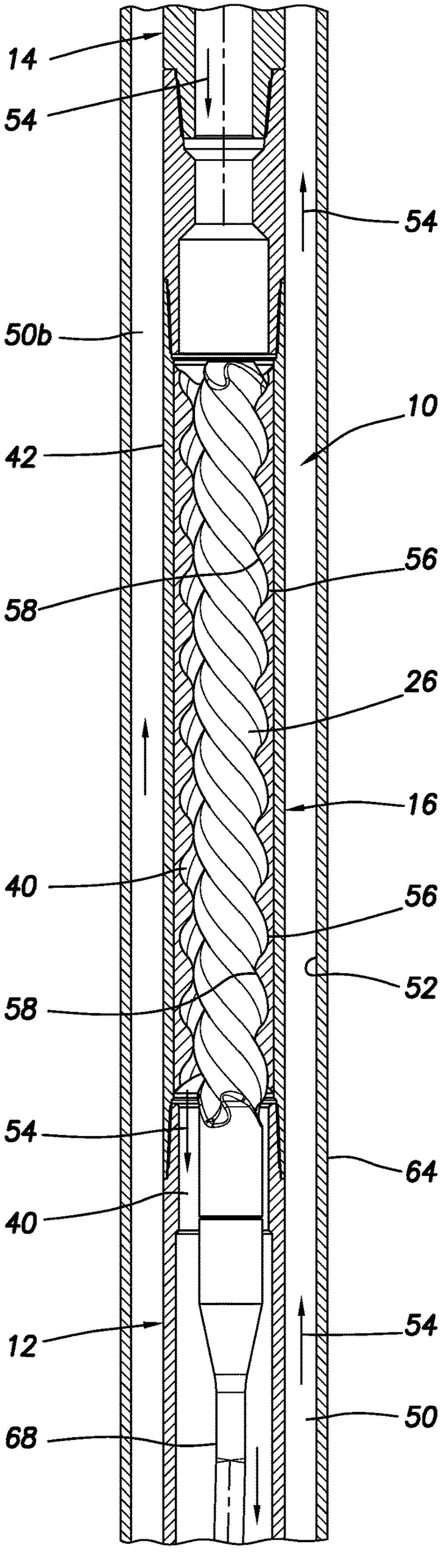
FIG. 2 is a representative partially cross-sectional view of an example of a fluid motor section of an ECD reduction tool that may be used with the FIG. 1 system and method.
Figure 3:
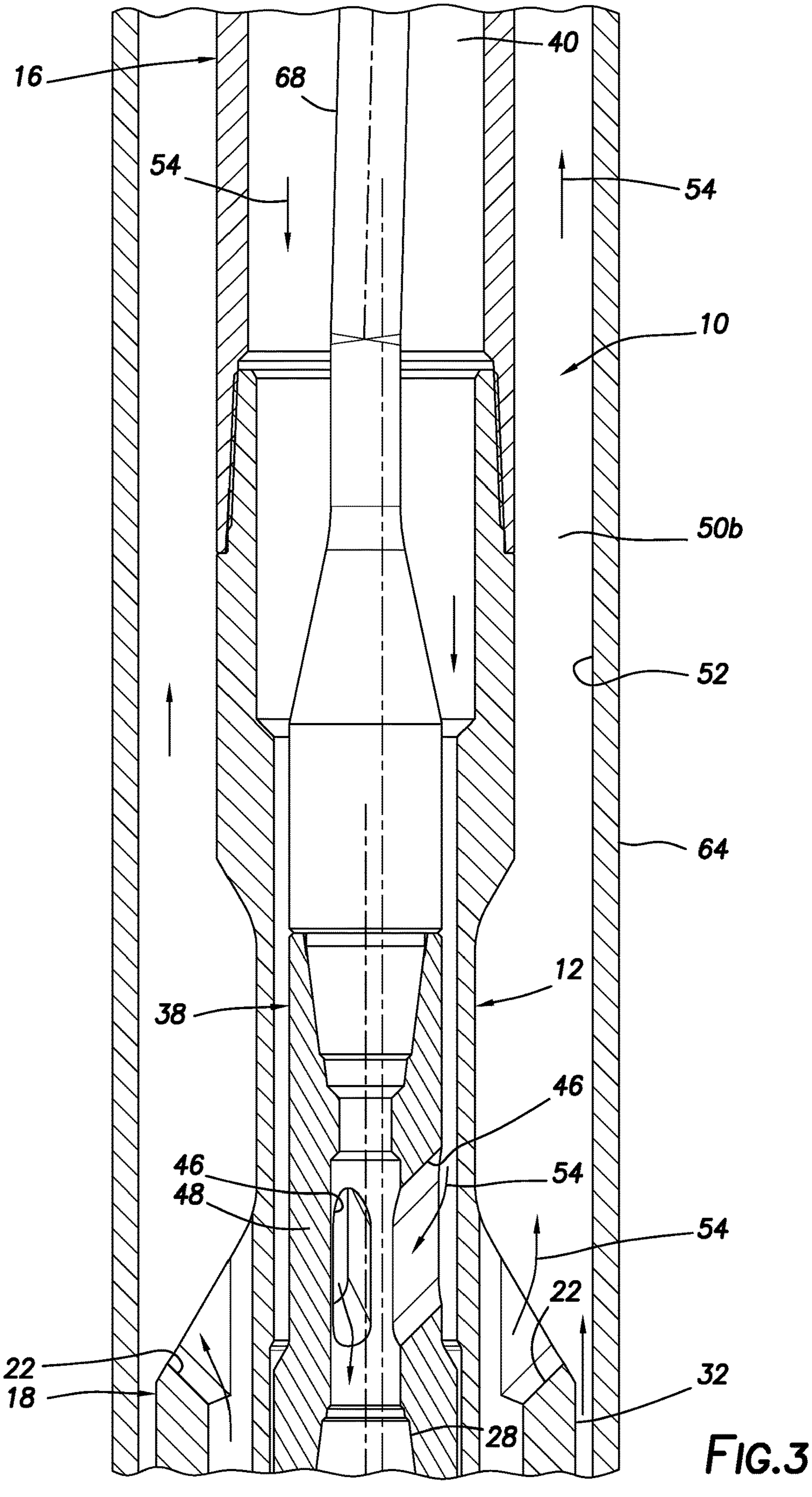
FIG. 3 is a representative partially cross-sectional view of an example of a coupler section of the ECD reduction tool.
Figure 4:
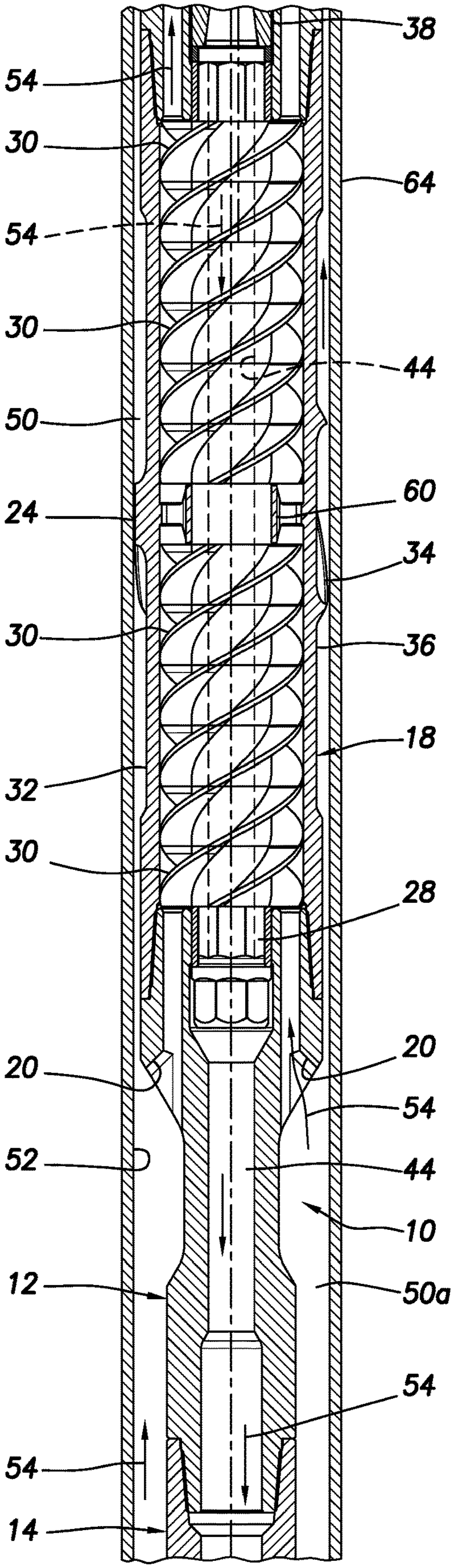
FIG. 4 is a representative partially cross-sectional view of an example of a fluid pump section of the ECD reduction tool.

Referring additionally now to FIGS. 2-4, a more detailed example of the ECD reduction tool 12 is representatively illustrated. For convenience of description, the tool 12 is depicted as being positioned in the casing 64, but it should be understood that it is not necessary for the tool to be positioned in any particular well structure. The FIGS. 2-4

ECD reduction tool 12 may be used with the well system 10 and method of FIG. 1, or it may be used with other systems or methods.

Referring specifically now to FIG. 2, a fluid motor section of the ECD reduction tool 12 is representatively illustrated. As depicted in FIG. 2, the fluid motor 16 is a Moineau-type positive displacement fluid motor. The fluid motor 16 includes a rotor 26 positioned within a stator 42. A flow passage 40 extends longitudinally through the fluid motor 16, including in a space between the rotor 26 and the stator 42.

The rotor 26 has a number of external helical lobes 56 formed thereon which engage a number of internal helical lobes 58 formed in the stator 42. The number of external lobes 56 is different from the number of internal lobes 58, thereby forming a cavity between the rotor 26 and the stator 42 that progresses longitudinally due to flow of the fluid 54 through the passage 40. Thus, rotation of the rotor 26 is produced by the flow of the fluid 54.

The rotor 26 also revolves as it rotates relative to the stator 42, so a flexible shaft 68 is connected at a lower end of the rotor. The flexible shaft 68 accommodates the revolving motion of the rotor 26. In other examples, a constant velocity joint or another device may be used to accommodate the revolving motion of the rotor 26.

Referring additionally now to FIG. 3, a coupler section of the ECD reduction tool 12 is representatively illustrated. The coupler section is used to couple the fluid motor 16 to the fluid pump 18, so that the rotation of the rotor 26 is transmitted to the fluid pump.

As depicted in FIG. 3, the flexible shaft 68 is connected to an upper end of a coupler 38. The coupler 38 is positioned in an outer housing 32 at an upper end of the fluid pump 18. The coupler 38 transmits the rotation of the rotor 26 and flexible shaft 68 to an impeller shaft 28 of the fluid pump 18.

The coupler 38 in this example is generally tubular in shape, with ports 46 formed radially through a tubular side wall 48. The ports 46 provide fluid communication between the flow passage 40 in the fluid motor 16 and a flow passage 44 (see FIG. 4) that extends longitudinally through the impeller shaft 28 of the fluid pump 18. Thus, the fluid 54 flows from the flow passage 40, inward through the ports 46 of the coupler 38, and then through the flow passage 44 in the impeller shaft 28.

Referring specifically now to FIG. 4, a fluid pump section of the ECD reduction tool 12 is representatively illustrated. As depicted in FIG. 4, an upper end of the impeller shaft 28 is connected to a lower end of the coupler 38. Thus, the impeller shaft 28 rotates with the coupler 38, the flexible shaft 68 and the rotor 26 (see FIG. 2) when the fluid 54 flows through the fluid motor 16.

Multiple helical shaped impellers 30 are carried on the impeller shaft 28, which has a hexagonal outer shape that engages a hexagonal central opening formed in each impeller. In this manner, the impellers 30 are constrained to rotate with the impeller shaft 28. Other arrangements (such as, using locating pins or other fasteners, slots and keys, splines, etc.) may be used to prevent relative rotation between the impeller shaft 28 and the impellers 30.

The fluid 54 flows from the coupler 38 to the flow passage 44 in the impeller shaft 28, and then into the tubular string 14 downhole of the fluid pump 18. The fluid 54 returns via the lower annulus section **50*a* to fluid inlets 20 of the fluid pump 18. Rotation of the impellers 30 causes the fluid 54 to be pumped from the fluid inlets 20 to fluid outlets 22 (see FIG. 3), and into the upper annulus section 50*b***.

The flow restriction 24 substantially restricts flow of the fluid 54 through the annulus 50 external to the outer housing 32. In this example, the flow restriction 24 comprises a radially enlarged portion of the outer housing 32. Specifically, a helical profile 34 is formed on an external surface 36 of the outer housing 32. The helical profile 34 reduces a flow area of the annulus 50 and forms a tortuous path for the flow of the fluid 54 through the annulus. However, the scope of this disclosure is not limited to use of any particular shape or configuration for the flow restriction 24.

A radial bearing 60 radially supports the impeller shaft 28 in the outer housing 32. In this example, the radial bearing 60 is positioned longitudinally between two sets of the impellers 30 on the impeller shaft 28.

It may now be fully appreciated that the above disclosure provides significant advancements to the art of controlling downhole pressure in well operations. In an example described above, the ECD reduction tool 12 is specially configured to achieve a desired reduction of ECD in response to flow of the fluid 54 through the tool.

The above disclosure provides to the art an equivalent circulating density (ECD) reduction tool 12 for use in a subterranean well. In one example, the ECD reduction tool 12 can comprise: a positive displacement fluid motor 16, and a fluid pump 18 configured to be driven by the fluid motor 16. The fluid pump 18 comprises a fluid inlet 20 and a fluid outlet 22 disposed on respective opposite sides of an external flow restriction 24.

The positive displacement fluid motor 16 may comprise a Moineau-type fluid motor. The fluid motor 16 may include a rotor 26, the fluid pump 18 may include a shaft 28 having at least one impeller 30 thereon, and the rotor 26 and the shaft 28 may be configured to rotate together.

The fluid pump 18 may include an outer housing 32. The external flow restriction 24 may comprise a helical profile 34 on an external surface 36 of the outer housing 32.

The ECD reduction tool 12 may include a coupler 38 configured to transmit a rotary output of the fluid motor 16 to an impeller shaft 28 of the fluid pump 18.

The fluid motor 16 may include a first flow passage 40 that passes between a rotor 26 and a stator 42 of the fluid motor 16, and the fluid pump 18 may include a second flow passage 44 that extends through an impeller shaft 28 of the fluid pump 18.

The ECD reduction tool 12 may include at least one port 46 that provides fluid communication between the first and second flow passages 40, 44. The at least one port 46 may be formed in a coupler 38 connected between the rotor 26 and the impeller shaft 28.

Also provided to the art by the above disclosure is a method of controlling equivalent circulating density (ECD) in a subterranean well. In one example, the method can comprise: connecting an ECD reduction tool 12 in a tubular string 14; deploying the tubular string 14 with the ECD reduction tool 12 into the well, thereby forming an annulus 50 between the tubular string 14 and a well surface 52 surrounding the tubular string 14; and flowing a fluid 54 into the well through the tubular string 14, the fluid 54 returning from the well via the annulus 50. The flowing step includes operating a positive displacement fluid motor 16 of the ECD reduction tool 12, the fluid motor 16 thereby rotating an impeller shaft 28 of a fluid pump 18.

The flowing step may include flowing the fluid 54 between a rotor 26 and a stator 42 of the fluid motor 16, the rotor 26 having external helical lobes 56, the stator 42 having internal helical lobes 58, and a number of the external lobes 56 being unequal to a number of the internal lobes 58.

The fluid returning step may include the fluid 54 flowing through a flow restriction 24 formed in the annulus 50 between the well surface 52 and a radially enlarged portion of the fluid pump 18. The radially enlarged portion may comprise a helical profile 34 formed on an external surface 36 of an outer housing 32 of the fluid pump 18.

The rotating step may include pumping the fluid 54 from the annulus 50*a* upstream of the flow restriction 24 to the annulus 50*b* downstream of the flow restriction 24. The rotating step may include transmitting rotation via a coupler 38 connected between the impeller shaft 28 and a rotor 26 of the fluid motor 16. The flowing step may include flowing the fluid 54 through at least one port 46 formed through a wall 48 of the coupler 38.

A well system 10 for use with a subterranean well is also described above. In one example, the well system 10 can comprise: an equivalent circulating density (ECD) reduction tool 12 deployed in the well, whereby an annulus 50 is formed between the ECD reduction tool 12 and a well surface 52 surrounding the ECD reduction tool 12. The ECD reduction tool 12 includes a positive displacement fluid motor 16, and a fluid pump 18 configured to be driven by the fluid motor 16. The fluid motor 16 comprises a coupler 38 configured to transmit a rotary output of the fluid motor 16 to an impeller shaft 28 of the fluid pump 18.

The fluid motor 16 may include a first flow passage 40 that passes between a rotor 26 and a stator 42 of the fluid motor 16. The fluid pump 18 may include a second flow passage 44 that extends through the impeller shaft 28.

The ECD reduction tool 12 can include at least one port 46 that provides fluid communication between the first and second flow passages 40, 44. The at least one port 46 may be formed through a wall 48 of the coupler 38.

The fluid pump 18 may comprise a fluid inlet 20 and a fluid outlet 22 disposed on respective opposite sides of an external flow restriction 24. The fluid pump 18 can include an outer housing 32, and the external flow restriction 24 can comprise a helical profile 34 on an external surface 36 of the outer housing 32.

Multiple impellers 30 may be disposed on the impeller shaft 28. A radial bearing 60 may support the impeller shaft 28 between at least two of the impellers 30.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as “above,” “below,” “upper,” “lower,” “upward,” “downward,” etc.) are used for convenience in referring to the accompanying drawings. However, it should be clearly understood that the scope of this disclosure is not limited to any particular directions described herein.

The terms “including,” “includes,” “comprising,” “comprises,” and similar terms are used in a non-limiting sense in this specification. For example, if a system, method, apparatus, device, etc., is described as “including” a certain feature or element, the system, method, apparatus, device, etc., can include that feature or element, and can also include other features or elements. Similarly, the term “comprises” is considered to mean “comprises, but is not limited to.”

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. An equivalent circulating density (ECD) reduction tool for use in a subterranean well, the ECD reduction tool comprising:

a positive displacement fluid motor;

a fluid pump, the fluid pump comprising a fluid inlet and a fluid outlet disposed on respective opposite sides of an external flow restriction; and a coupler connected between a rotor of the fluid motor and an impeller shaft of the fluid pump, in which the coupler is configured to transmit a rotary output of the fluid motor to the impeller shaft of the fluid pump, and in which the coupler comprises at least one port which permits fluid flow into a first flow passage of the impeller shaft.

2. The ECD reduction tool of claim 1, in which the positive displacement fluid motor comprises a Moineau-type fluid motor.

3. The ECD reduction tool of claim 2, in which the fluid pump comprises the impeller shaft having at least one impeller thereon, and in which the rotor and the impeller shaft are configured to rotate together via the coupler.

4. The ECD reduction tool of claim 1, in which the external flow restriction comprises a helical profile on an external surface of an outer housing.

5. The ECD reduction tool of claim 1, in which the fluid motor comprises a second flow passage that passes between a rotor and a stator of the fluid motor, the first flow passage extends through the impeller shaft of the fluid pump, and the at least one port provides fluid communication between the first and second flow passages.

6. An equivalent circulating density (ECD) reduction tool for use in a subterranean well, the ECD reduction tool comprising:

a positive displacement fluid motor; and a fluid pump configured to be driven by the fluid motor, the fluid pump comprising a fluid inlet and a fluid outlet disposed on respective opposite sides of an external flow restriction, in which the fluid motor comprises a first flow passage that passes between a rotor and a stator of the fluid motor, the fluid pump comprises a second flow passage that extends through an impeller shaft of the fluid pump, and the ECD reduction tool further comprises at least one port that provides fluid communication between the first and second flow passages, and in which the at least one port is formed in a coupler connected between the rotor and the impeller shaft.

7. A method of controlling equivalent circulating density (ECD) in a subterranean well, the method comprising:

connecting an ECD reduction tool in a tubular string;

deploying the tubular string with the ECD reduction tool into the well, thereby forming an annulus between the tubular string and a well surface surrounding the tubular string; and flowing a fluid into the well through the tubular string, the fluid returning from the well via the annulus, in which the flowing comprises operating a positive displacement fluid motor of the ECD reduction tool, the fluid motor thereby rotating an impeller shaft of a fluid pump, in which the rotating comprises transmitting rotation via a coupler connected between the impeller shaft and a rotor of the fluid motor, and in which the flowing further comprises flowing the fluid through at least one port formed through a wall of the coupler.

8. The method of claim 7, in which the flowing further comprises flowing the fluid between the rotor and a stator of the fluid motor, the rotor having external helical lobes, the stator having internal helical lobes, and a number of the external lobes being unequal to a number of the internal lobes.

9. The method of claim 7, in which the fluid returning comprises the fluid flowing through a flow restriction formed in the annulus between the well surface and a radially enlarged portion of the fluid pump.

10. The method of claim 9, in which the radially enlarged portion comprises a helical profile formed on an external surface of an outer housing of the fluid pump.

11. The method of claim 9, in which the rotating comprises pumping the fluid from the annulus upstream of the flow restriction to the annulus downstream of the flow restriction.

12. A well system for use with a subterranean well, the well system comprising:

an equivalent circulating density (ECD) reduction tool deployed in the well, whereby an annulus is formed between the ECD reduction tool and a well surface surrounding the ECD reduction tool, the ECD reduction tool comprising a positive displacement fluid motor, a fluid pump configured to be driven by the fluid motor, and a coupler connected between a rotor of the fluid motor and an impeller shaft of the fluid pump, in which the coupler is configured to transmit a rotary output of the fluid motor to the impeller shaft of the fluid pump, in which the fluid motor comprises a first flow passage that passes between the rotor and a stator of the fluid motor, the fluid pump comprises a second flow passage that extends through the impeller shaft, and the ECD reduction tool further comprises at least one port that provides fluid communication between the first and second flow passages, and in which the at least one port is formed through a wall of the coupler.

13. The well system of claim 12, in which the fluid pump comprises a fluid inlet and a fluid outlet disposed on respective opposite sides of an external flow restriction.

14. The well system of claim 13, in which the fluid pump further comprises an outer housing, and the external flow restriction comprises a helical profile on an external surface of the outer housing.

15. The well system of claim 12, in which multiple impellers are disposed on the impeller shaft, and a radial bearing supports the impeller shaft between at least two of the impellers.

* * * * *